United States Patent [19]
Spaepen et al.

[11] 3,944,473
[45] Mar. 16, 1976

[54] METHOD FOR INFLUENCING AN ELECTROCATALYTIC REACTION PROCEEDING AT AN ELECTRODE

[75] Inventors: Gustaaf Frans Josef Spaepen, Dessel; Jan-Baptist Hugo Vandenborre, Kasterlee, both of Belgium

[73] Assignee: Studiecentrum Voor Kernenergie, S.C.K., Brussels, Belgium

[22] Filed: May 23, 1974

[21] Appl. No.: 472,844

[30] Foreign Application Priority Data
May 30, 1973 Belgium .................................. 800271

[52] U.S. Cl. ..................... 204/79; 204/78; 204/228
[51] Int. Cl.² ..................... C25B 3/02; C25B 15/02
[58] Field of Search ............................... 204/78–79, 204/DIG. 8–DIG. 9, 80, 228 A

[56] References Cited
UNITED STATES PATENTS
| | | | |
|---|---|---|---|
| 1,534,709 | 4/1925 | Holt | 204/DIG. 9 |
| 2,130,151 | 9/1938 | Palfreeman et al. | 204/78 |

FOREIGN PATENTS OR APPLICATIONS
| | | | |
|---|---|---|---|
| 1,903,520 | 8/1970 | Germany | 204/78 |

*Primary Examiner*—R. L. Andrews
*Attorney, Agent, or Firm*—Stevens, Davis, Miller & Mosher

[57] ABSTRACT

A potential pulse train corresponding to the reaction proceeding at the electrode is superposed on the potential of the electrode for influencing an electrocatalytic reaction proceeding at that electrode.

Examples of such reactions are the oxidation of methanol on a platinum electrode and the oxidation of hydrogen, hydrazine or ammonia on an alloy electrode.

20 Claims, 4 Drawing Figures

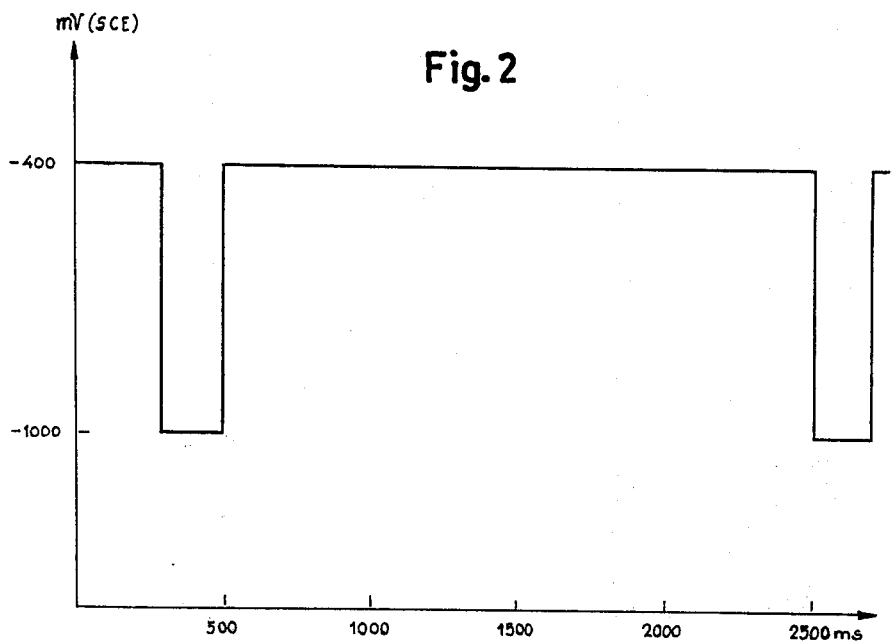
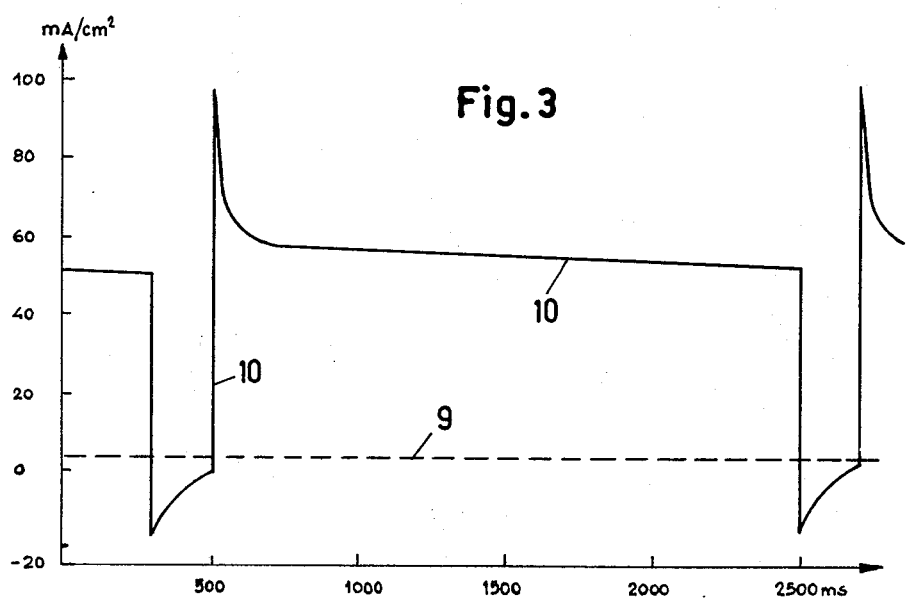

METHOD FOR INFLUENCING AN ELECTROCATALYTIC REACTION PROCEEDING AT AN ELECTRODE

This invention pertains to a method for influencing an electrocatalytic reaction proceeding at an electrode, according to which a pulse is superimposed on the electrode potential.

It is already known to obviate partly some of the ageing phenomenons which occur in existing electrocatalysts by bringing temporarily the catalyst-forming electrode to another potential. This does not provide better electrocatalytic action but only partially restores the original catalytic action.

The duration of the pulses used is rather long and lies in the range of seconds to minutes, while the working time between pulses lies in the range of minutes to hours.

It is also already known to activate an electrode by superimposing pulses on the potential thereof. The pulses are superimposed for short time intervals only, as a activation and not a continuous influencing of the electrocatalytic reaction is sought.

It is also known from fundamental research that it is possible to obtain a power increase of up to 90% by rapidly alternating the applied electrode potential during a limited time period.

An object of the method according to the invention is to influence continuously the electrocatalytic reaction, either by letting the reaction proceed much faster on or adjacent a known catalyst, or by causing an electrocatalytic reaction on or adjacent a material which normally forms a catalyst, or by promoting or slowing down one of the possible electrocatalytic reactions, thereby making it possible to improve the output of an electrocatalytic synthesis.

For this purpose according to the invention, a potential pulse train which corresponds to the reaction proceeding at the electrode is permanently superimposed on the electrode potential.

It was found surprisingly that by using a potential pulse train determined in terms of the electrode material, the reagents and the medium, a power increase in the range of 1000% or a substantial increase in efficiency was obtained for one final product of the reaction. This is due to application of the pulse to bring the electrode temporarily to a potential which is particularly suitable for the development of partial reactions, which potential does not necessarily corresponds to the potential for the total reaction.

An application of the invention relates to the action on the oxidation of methanol on platinum. According to the invention, a cathodic pulse having a pulse duration in the range of one tenth to one fiftieth of the time interval between pulses is superimposed on a platinum electrode.

Such application is for example made in an alkaline medium.

In an advantageous embodiment of the invention, the pulse duration lies in the range of 200 milliseconds.

Preferably the pulse amplitude lies in the range of 600 millivolts.

Another application of the invention relates to the action on the oxidation of a material from the group formed by the hydrogen, the hydrazine and the ammonia on an alloy. According to the invention, on the potential of the electrode-forming alloy, are superimposed cathodic pulses some of which at least are preceded by anodic pulses and whereby the pulse duration of the anodic pulses lies in the range of one tenth to one two-thousandth of the time interval between pulses and the pulse duration of the cathodic pulses lies in the range of one tenth to one fiftieth of the time interval between pulses. The alloy is for example an intermetallic compound and the application is made for example in an acid medium.

In an advantageous embodiment, the duration of an anodic pulse lies in the range of 100 milliseconds to 2 seconds.

In a particular embodiment of the invention, the duration of a cathodic pulse lies in the range of 200 milliseconds.

Preferably, the anodic pulse amplitude lies in the range of 2.4 volts.

Preferably, the cathodic pulse amplitude lies in the range of 300 millivolts.

Other details and features of the invention will stand out from the description given below by way of non limitative example and with reference to the accompanying drawings, in which:

FIG. 2 shows a pulse train applied in a first embodiment of a method according to the invention.

FIG. 3 shows a current curve corresponding to the pulse train shown in FIG. 2.

In the various figures, the same reference numerals pertain to similar elements.

Figure 1:
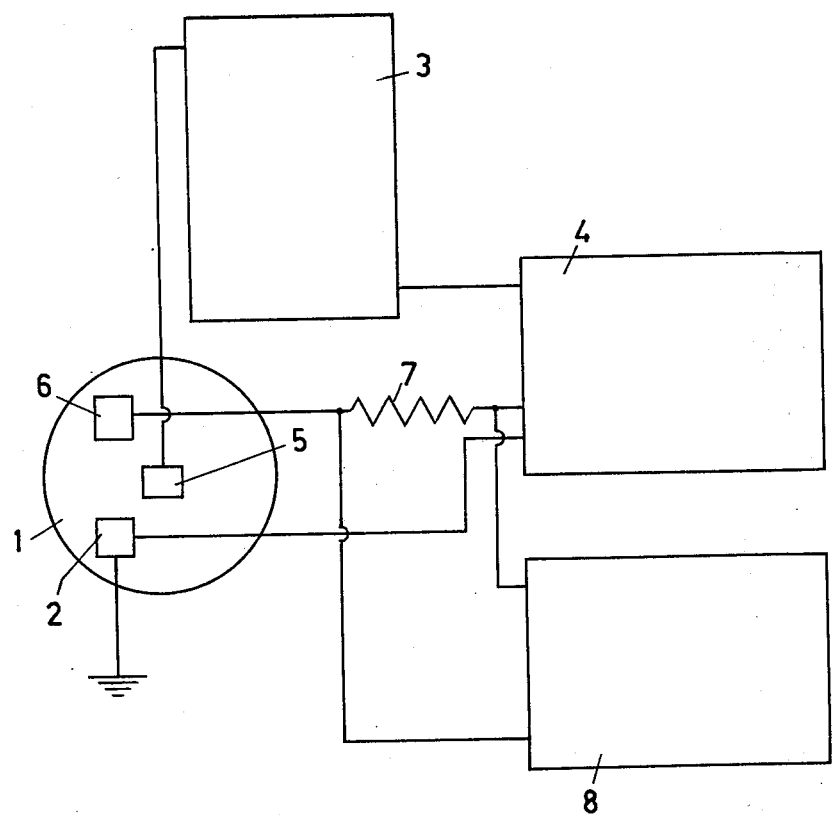
FIG. 1 is a simplified electric diagram of an installation for carrying out the method according to the invention for influencing an electrocatalytic reaction proceeding at an electrode.

Inside a cell shown generally at 1, on the potential of a working electrode 2 are superimposed potential pulses by means of a function generator 3 and a potentiostate 4. Besides the working electrode 2 and a reference electrode 5 connected to the function generator, the cell further comprises a counter-electrode 6 which is connected through a resistor 7 with a resistance of 100 ohms for example, to the potentiostate. The reference electrode 5 is for example a saturated calomel electrode and the counter-electrode 6 a silver electrode. The voltage across resistor 7 which corresponds to the current strength, is recorded by means of a recorder 8.

In a first application, the working electrode 2 is a platinum electrode the working potential of which and the pulse train superimposed thereon are determined by the function generator 3 and the potentiostate 4. The electrodes are arranged in a liquid mixture comprised of 80 volume % of electrolyte and 20 volume % of $CH_3OH$. The electrolyte proper is a non-aerated 12N KOH solution. Said concentration is however not critical. The potential curve of the working electrode 2 is shown in FIG. 2. The time is given in milliseconds on the abscissa and the potential of the working electrode 2 is given in millivolts relative to the saturated calomel electrode 5 on the ordinate.

The operating potential of electrode 2 without the pulses is −400 millivolts relative to the saturated calomel electrode. Cathodic pulses with a duration in the range of 10 milliseconds to 500 milliseconds, for example with a duration of 200 milliseconds are superimposed on the operating potential. The time interval between two pulses is in the range of 2 seconds. By cathodic and anodic pulse respectively, there is meant in the present application a pulse whereby the working electrode potential relative to the saturated calomel electrode is changed in a negative and a positive direction respectively. The amplitude of the pulses is in the range of 500 to 1000 millivolts and preferably in the range of 600 millivolts. During the pulses the potential of electrode 2 relative to the calomel electrode is thus in the range of −900 to −1400 millivolts and preferably about −1000 millivolts.

The current curve as measured across resistor 7 when no pulses are superimposed on the normal operating potential, follows line 9 in the diagram shown in FIG. 3 which gives the current flow in terms of the time in milliseconds. The current strength is given in milliamperes per square centimeter of geometrical electrode area. Line 10 in the diagram of FIG. 3 shows the current flow in the same resistor 7 when potential pulses as shown in FIG. 2 are superimposed on the normal operating potential. The current strength is somewhat reduced during the cathodic pulses but increases substantially outside these pulses, in such a way that the total power as compared with an embodiment without pulses is increased about ten-fold. The curve for the current strength remains as shown whatever the working time duration, even after weeks. It is to be noticed that the power required for superimposing pulses is negligible relative to the power gain.

Figure 4:
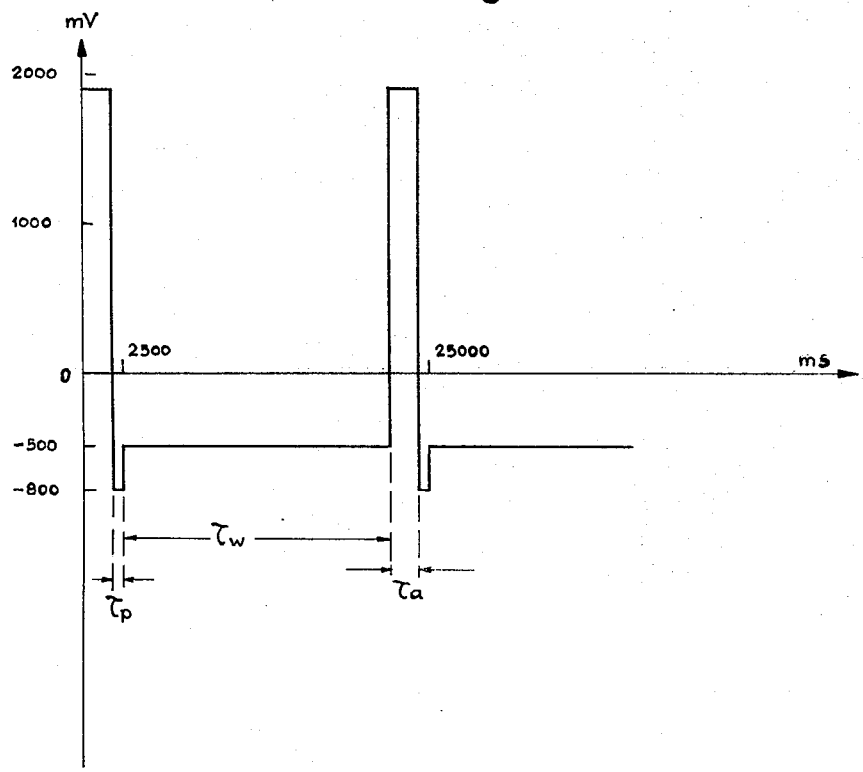
FIG. 4 shows a pulse train applied in a second embodiment of a method according to the invention.

In another embodiment of the method according to the invention, the liquid is 1N $H_2SO_4$ and the working electrode 2 is comprised of an alloy, for example an intermetallic compound. The sulfuric acid concentration is not critical. The liquid is saturated with hydrogen or comprises at the most 20 volume % of ammonia or hydrazine. The intermetallic compound is preferably a combination between a metal of group IV and a metal of group VI of Mendeleeff's classification. Particularly good results are obtained with a lead-tellurium compound. To the working electrode 2 is imposed in the way shown in FIG. 1, a potential the curve of which is shown in the diagram of FIG. 4. The normal operating potential, without the pulses, is about −500 millivolts relative to the saturated calomel electrode. On the operating potential are superimposed in succession an anodic pulse and a cathodic pulse. The amplitude of the anodic pulse is in the range of 2 volts to 2.5 volts and preferably about 2.4 volts, in such a way that the potential of electrode 2 during the anodic pulses is in the range of 1.5 volts to 2 volts and preferably about 1.9 volts relative to the saturated calomel electrode.

The amplitude of the cathodic pulses is in the range of 100 millivolts to 500 millivolts and preferably about 300 millivolts, in such a way that electrode 2 has during the cathodic pulses a potential of −600 millivolts to −1000 millivolts and preferably 800 millivolts relative to the saturated calomel electrode.

The time interval between pulses shown by $\tau w$ in FIG. 4, is in the range of 1 second to 20 seconds and it is preferably 20 seconds. The duration of an anodic pulse shown in FIG. 4 by $\tau a$, is for example in the range of 100 milliseconds to 2 seconds. The duration of a cathodic pulse shown in FIG. 4 by $\tau p$, is preferably in the range of 10 milliseconds to 500 milliseconds and preferably about 200 milliseconds.

Moreover the duration of the anodic pulses is in the range of one tenth to one two-thousandth of the time interval between pulses and the duration of the cathodic pulses lies in the range of one tenth to one fiftieth of the time interval between pulses. In other words:

$$10 \leq \frac{\tau w}{\tau a} \leq 2000$$
and
$$10 \leq \frac{\tau w}{\tau p} \leq 50$$

It is not necessary that each cathodic pulse be preceded by an anodic pulse and the ratio of the number of anodic pulses to the number of cathodic pulses can for example lie in the range of 1/10.

With such pulses, the lead-tellurium compound or generally a compound of the IV–VI type acts as a catalyst and a mean current strength is obtained which lies in the range of three-quarters of that current strength which can be obtained with platinum as catalyst under the same conditions. There result therefrom that a combination of non-noble metals can be used as catalyst with a suitable potential pulse train.

There results from the above that by superimposing on the electrode potential a potential pulse train that corresponds to the reaction proceeding at the electrode, it is possible to act on this reaction either by increasing the speed thereof or by letting the reaction proceed on a material which is normally not suitable as a catalyst. Moreover when at least two reactions each comprised of a series of part reactions, occur at the electrode, the reactions can be aided or slowed down by means of suitable pulse trains, in such a way that the output of the one final product is improved and the output of another final product is reduced. Use thereof can be made with electro-organic synthesis.

The invention is in no way limited to the above embodiments and many changes can be brought therein without departing from the scope of the invention as defined by the following claims.

It is notably possible to measure the current strength with an ammeter instead of by means of the recording of the voltage drop in a resistor. For very fast pulse rates, the recording by means of an oscillograph is suitable.

We claim:

1. In a cell including a platinum electrode, a counter-electrode and a reference electrode positioned in an alkaline medium including methanol, said platinum electrode being negative with respect to said reference electrode and positive with respect to said counter-electrode, the method of influencing the oxidation of methanol at said platinum electrode comprising the step of superimposing between said platinum and reference electrodes cathodic potential pulses having a polarity such that said platinum electrode is rendered more negative with respect to said reference electrode, each of said pulses having an amplitude in the range 500 to 1,000 millivolts and a duration in the range 10 to 500 milliseconds, the time interval between two successive pulses being in the range of 10 to 50 times the duration of one pulse.

2. The method defined by claim 1, wherein the amplitude of said pulses is approximately 600 millivolts and the duration of said pulses is approximately 200 milliseconds.

3. The method defined by claim 1, wherein the time interval between two successive pulses is approximately 2 seconds.

4. The method defined by claim 1, wherein said reference electrode is a saturated calomel electrode.

5. The method defined by claim 1 wherein said counter-electrode is a silver electrode.

6. The method of anodic oxidation of methanol comprising the steps of positioning a platinum electrode, a reference electrode and a counter-electrode in an alkaline medium including methanol, said platinum electrode becoming negative with respect to said reference electrode and positive with respect to said counter-electrode, connecting a load element to which electrical energy is to be supplied between said platinum electrode and said counter-electrode, connecting a function generator between said platinum electrode and said reference electrode, and superimposing cathodic potential pulses across said platinum and reference electrodes by means of said function generator such that said platinum electrode is made more negative with respect to said reference electrode, each of said pulses having an amplitude in the range 500 to 1,000 millivolts and a duration in the range 10 to 500 milliseconds, the time interval between two successive pulses being in the range of 10 to 50 times the duration of one pulse.

7. The method defined by claim 6, wherein the amplitude of said pulses is approximately 600 millivolts and the duration of said pulses is approximately 200 milliseconds.

8. The method defined by claim 6, wherein the time interval between two successive pulses is approximately 2 seconds.

9. The method defined by claim 6, wherein said reference and counter-electrodes are a saturated calomel and silver electrodes respectively and said load element is a resistor.

10. In a cell including a working electrode comprised of an alloy, a counter-electrode and a reference electrode positioned in an acid medium containing a material selected from the group consisting of hydrogen, hydrazine and ammonia, said working electrode being negative with respect to said reference electrode and positive with respect to said counter-electrode, the method of influencing the oxidation of a material from said group at said working electrode comprising the step of superimposing between said working and reference electrodes cathodic potential pulses having a polarity such that said working electrode is rendered more negative with respect to said reference electrode, each of said cathodic pulses having an amplitude in the range 100 to 500 millivolts and a duration in the range 10 to 500 milliseconds, the time interval between two successive pulses being in the range from 1 to 20 seconds.

11. The method defined by claim 10, which further comprises the step of superimposing between said working and reference electrodes, prior to application of at least some of said cathodic pulses, anodic potential pulses having a polarity such that said working electrode is rendered positive with respect to said reference electrode, each of said anodic pulses having an amplitude in the range 2 to 2.5 volts and a duration in the range 100 milliseconds to 2 seconds.

12. The method defined by claim 11, wherein the amplitude of said anodic pulses is approximately 2.4 volts.

13. The method defined by claim 11, wherein the ratio of anodic pulse to cathodic pulses superimposed between said working and reference electrodes is approximately 1 to 10.

14. The method defined by claim 10, wherein the amplitude of said cathodic pulses is approximately 300 millivolts and the duration of said pulses is approximately 200 milliseconds.

15. The method defined by claim 10, wherein said acid medium is $H_2SO_4$ and said reference electrode is a saturated calomel electrode.

16. The method defined by claim 10 wherein said counter-electrode is a silver electrode.

17. The method of anodic oxidation of material selected from the group consisting of hydrogen, hydrazine and ammonia comprising the steps of positioning a working electrode comprised of an alloy, a reference electrode and a counter-electrode in an acid medium containing a material selected from the group consisting of hydrogen, hydrazine and ammonia, said working electrode becoming negative with respect to said reference electrode and positive with respect to said counter-electrode, connecting a load element to which electrical energy is to be supplied between said working electrode and said counter-electrode, connecting a function generator between said working electrode and said reference electrode, and superimposing cathodic potential pulses across said working and reference electrodes by means of said function generator such that said working electrode is rendered more negative with respect to said reference electrode, each of said cathodic pulses having an amplitude in the range 100 to 500 millivolts and a duration in the range 10 to 500 milliseconds, the time interval between two successive pulses being in the range from 1 to 20 seconds.

18. The method defined by claim 17, which further comprises the step of superimposing between said working and reference electrodes, prior to application of at least some of said cathodic pulses, anodic potential pulses having a polarity such that said working electrode is rendered positive with respect to said reference electrode, each of said anodic pulses having an amplitude in the range 2 to 2.5 volts and a duration in the range 100 milliseconds to 2 seconds.

19. The method defined by claim 17, wherein said working electrode consists essentially of a combination of a metal selected from Group IV and a metal selected from Group VI of Mendeleeff's classification.

20. The method defined by claim 17, wherein said working electrode is a lead-tellurium compound.

* * * * *